United States Patent [19]

Syme

[11] Patent Number: 4,776,051

[45] Date of Patent: Oct. 11, 1988

[54] METHOD AND APPARATUS FOR SEPARATING OR EXTRACTING BEES WAX AND HONEY

[76] Inventor: Raymond J. Syme, Flyns Road, Staveley, No. 1 R.D., Ashburton, Mid-Canterbury, New Zealand

[21] Appl. No.: 888,212

[22] Filed: Jul. 23, 1986

[30] Foreign Application Priority Data

Jul. 24, 1985 [NZ] New Zealand .................. 212859

[51] Int. Cl.$^4$ ............................................. A01K 59/06
[52] U.S. Cl. ..................................... 6/12 R; 210/361
[58] Field of Search .................. 6/12 R, 12 A, 12 M; 210/361, 380.1

[56] References Cited

U.S. PATENT DOCUMENTS

| | | | |
|---|---|---|---|
| 1,791,605 | 2/1931 | Root | 210/361 |
| 1,825,020 | 9/1931 | Snyder | 210/361 |
| 2,203,438 | 6/1940 | Maendel | 210/361 |

FOREIGN PATENT DOCUMENTS 174424  10/1905  Fed. Rep. of Germany ...... 210/361

Primary Examiner—Robert P. Swiatek
Attorney, Agent, or Firm—Holman & Stern

[57] ABSTRACT

A method of separating bees wax and honey, the method including: packing a plurality of combs tightly together in a spinner which has a plurality of holes in the periphery thereof; rotating the spinner so that honey in the combs flows outward from the center of the spinner to the outside until the honey passes through the holes for collection. The spinner can be a generally cylindrical spinner with a cone shaped base. The bees wax and honey can be placed in the spinner as either cappings from the hive frames or packing a plurality of hive frames radially in the spinner. According to another aspect of the invention there is provided an apparatus for separating bees wax and honey, the apparatus including a vat in which a generally cylindrical spinner is mounted with its longitudinal axis vertical, the spinner having in the periphery thereof a plurality of holes and having a cone as a base, the vat having associated therewith a drive which rotates the spinner concentrically therewith so that honey and bees wax placed as cappings in the spinner or in frames are spun to the outside cylindrical wall of the spinner before the honey passes through the holes for collection from an outlet of the vat.

10 Claims, 1 Drawing Sheet

METHOD AND APPARATUS FOR SEPARATING OR EXTRACTING BEES WAX AND HONEY

FIELD OF THE INVENTION

The invention relates to bee keeping and more particularly to a method and apparatus for separating or extracting honey from a mixture of bees wax and honey.

BACKGROUND OF THE INVENTION

In bee keeping the bees wax and honey is formed in hives on wood or the like frames which when they are initially placed in the hive have a bees wax liner extending on wires across the frame to form a foundation for a comb which is formed by the bees. The foundation having comb shaped recesses formed in the bees wax and on which the bees themselves form their own combs. In practice when the frames are removed from the hive for collection or extraction of the honey the initial step is to remove from the frame the cappings on the comb. These cappings are a mixture of bees wax and honey which have to be separated into wax and honey. A frame with foundation liner normally weighs about ½ lb while a full frame can weigh up to about 10 lbs.

In the past a number of methods have been used to separate bees wax and honey, for example they have been separated by heating the mixed bees wax and honey and allowing the heavier honey to settle out. This procedure is time consuming as it takes from 12 to 48 hours for the process to be completed. Another method of honey extraction used in the past has relied on the effect of a centrifugal force tending to draw the honey from the honey combs. No system known to the applicant has been able to support the combs against the stresses of such a centrifugal force. A "Pender" semi-radial extractor used in Australia presented combs at right angles to the centrifugal force thus having had a great weight of honey trapped on the inside which tends to create severe breakages in the combs. "Pender" and "Cowan" full radial extractors as used in Australia and U.S.A. respectively presented combs along the central axis and had the advantage of dual extraction from both sides at once; but the problem of a force breaking combs remains. In both of these above types of extractor the speed of operation must be carefully and continuously controlled to minimize stress build up. Average times for extraction are:
full radial—15-20 minutes—50-70 frames
semi radial—12-17 minutes—8-12 frames

SUMMARY OF THE INVENTION

An object of the present invention is therefore to provide a method and apparatus for separating and extracting honey from a mixture of bees wax and honey which overcome at least in part the above disadvantages.

According to a first aspect of the invention there is provided a method of separating bees wax and honey, the method including:
packing a plurality of combs tightly together in a spinner which has a plurality of holes in the periphery thereof;
rotating the spinner so that honey in the combs flows outward from the centre of the spinner to the outside until the honey passes through the holes for collection.

According to a second aspect of the invention there is provided a method of separating bees wax and honey, the method including the steps of:
forming a generally cylindrical spinner with a plurality of holes in the periphery thereof;
mounting in the cylindrical spinner a cone shaped base;
mounting the spinner with its longitudinal axis vertical within a vat which has a drain aperture in the base thereof;
either placing in the spinner the cappings from the hive frames or packing the cylinder with a plurality of hive frames with the honey comb therewith;
rotating the spinner to cause the honey and wax to separate and the honey to flow outwardly and through the holes in the periphery of the spinner for collection from the vat.

Preferably the hive frames are closely packed radially into the spinner with end bars of the frames against the wall of the spinner.

The method can additionally include the application of heat to the spinner and/or vat to allow the honey and wax to separate more easily.

According to another aspect of the invention there is provided an apparatus for separating bees wax and honey, the apparatus including a vat in which a generally cylindrical spinner is mounted with its longitudinal axis vertical, the spinner having in the periphery thereof a plurality of holes and having a cone as a base, the vat having associated therewith a drive means which rotates the spinner concentrically therewith so that honey and bees wax placed as cappings in the spinner or in frames are spun to the outside cylindrical wall of the spinner before the honey passes through the holes for collection from an outlet of the vat.

DESCRIPTION OF A PREFERRED EMBODIMENT

The apparatus shown in the example is manufactured from stainless steel but could alternatively be manufactured from other materials which are corrosion resistant or hygenic including rigid reinforced or unreinforced plastics materials.

Figure 2:
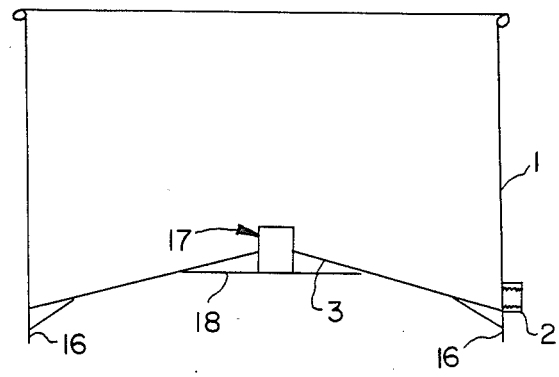
FIG. 2 is a section through a vat for incorporation in the apparatus and in which the spinner shown in FIG. 1 is mounted; and, FIG. 3 is a plan view of the vat shown in FIG. 2.
Figure 3:
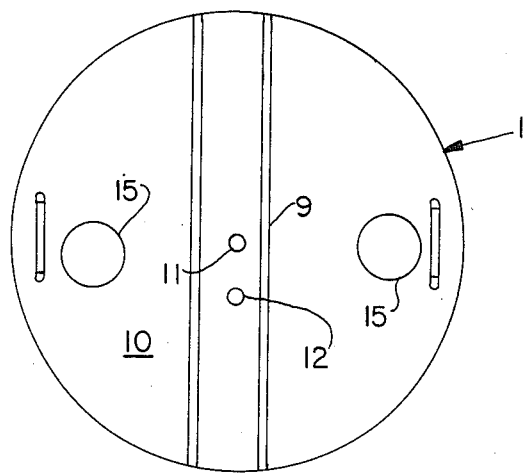

The apparatus includes a vat (FIGS. 2 and 3) 1 which is generally cylindrical and is mounted on the ground or on legs 16 as required normally at an apiary. The vat 1 has an outlet 2 and can have a cone-shaped floor 3 (FIG. 2). The vat 1 has mounted in association therewith (not shown in the drawing) a drive mechanism. The vat 1 can also include means for heating the interior thereof.

Figure 1:
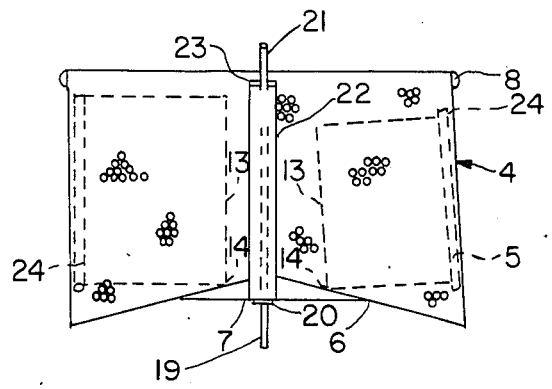
FIG. 1 is a section through a spinner for an apparatus according to the invention for separating or extracting honey from a mixture of bees wax and honey.

The vat 1 has mounted therein a tubular bearing member 17 and a spinner 4 (FIG. 1). The member 17 extends through the cone shaped floor 3 and is fixed to a plate 18 welded across the floor. The plate 18 has a hole through which a driven shaft 19 for the spinner 4 extends. The spinner 4 is also generally cylindrical and is manufactured from stainless steel with a plurality of holes in the periphery 5 thereof. The walls 5 of the spinner 4 can be manufactured from stainless steel mesh mounted on a cone-shaped base 6. The spinner 4 has mounted under its cone-shaped base 6 a plate 7 beneath which is a collar 20 which takes the weight of the spinner 4. The shaft 19 at its bottom is machined to take a tapered roller bearing mounted in a flangett base. The upper end 21 of the shaft 19 is fitted with a self aligning bearing. Concentric with the shaft 19 is a stainless spirally wound tube 22 with a mild steel bush 23 keyed to the shaft. The bush 23 is welded to the spiral tube 22. The collar 20 is welded to the shaft 19. A circular ring or tube 8 can maintain the mesh rigid when the spinner 4 is rotating. The drive for the spinner 4 is via a drive mechanism mounted over the top of the vat 1 and beneath the cover 9 (FIG. 3) which extends across the top 10 of the vat 1. The drive can be via the shaft 19 extending down through the hole 11 in the top 10. The shaft 19 extends through the base 6 of the spinner 4. The top 10 also has a hole 12 through which a pipe (not shown) extends from an uncapping machine which is mounted alongside the vat 1.

The spinner has heavy duty bearings, a soft-start D.C. motor, A.C. supply and is electronically controlled i.e., speed and braking are controlled automatically.

In use when the apparatus is used to separate honey from bees wax and honey cappings the mass of cappings from the uncapping machines is pumped via inlet hole 12 into the bottom of the spinner 4. The spinner 4 is rotated at about 300 rpm for 3 to 4 minutes and during this time the mass of cappings including bees wax and honey is forced against the outside wall or periphery 5 of the spinner and the heavier honey passes through the holes in the spinner and falls down for collection from the outlet 2 of the vat. The remaining cappings, mostly bees wax, are then removed from the spinner 4.

In use when a plurality of frames 13 with honey therein are to be separated the frames are packed with their lugged ends or end bars 24 against the periphery 5 of the spinner 4. The frames 13 in practice taper in thickness from the bars 24 to the edge 14 so that the frames 13 are in contact along their contacting side edges. The cone-shaped base 6 supports the inner edge 14 (dotted in FIG. 1) of the frames 13 which are positioned radially extending around the spinner 4. Alternatively (not shown) the boxes in which the hives are formed from a plurality of frames can be inserted in the spinner (after the frames have been uncapped).

The shape of the base 6 as well as causing the heavier honey to drain to the outside more easily during rotation also allows the same spinner to be used to hold a variety of different sized frames either together or separately and without the need for an inner means for holding the frames stable at the centre of the spinner. The spinner 4 can be filled with frames (about 90–100). About 90–100 full depth frames can be carried in a spinner having a diameter of about 4 feet. The spinner 4 is rotated at about 150 rpm for 3 to 5 minutes. The honey flows out across the frames and then through the holes in the spinner 4 for collection from the vat 1 at outlet 2. The dry (without honey) frames are then removed from the spinner for reuse.

In this manner each comb supports its neighbour and the proximity of each frame's open cells to its fellow retards the flow of extraction, controlling the stress load placed on the comb in a unique manner. That is, the centrifugal effect on the comb drains those cells nearest the centre of the spinner first. While this honey flows across the cells nearer the outside, they are prevented from emptying, thus being more incompressible they offer maximum support to resist collapsing of the comb. In this manner, the inherent strength of the honey comb is utilized rather than broken down as in existing honey extracting systems.

An advantage is that the draining honey acts as a coherent whole, actually drawing and draining the honey far faster than has previously been possible. The honey does not attempt to form droplets as it leaves the combs but flows continuously till drainage is complete. This flow effect allows great savings in time and comb breakage and allows honey to be extracted colder, without needing heating which has been necessary with previous systems.

Apart from these savings i.e. 90–110 frames extracted clean in 3–4 minutes ('Pender' full radial 50–70 frames in 15–20 minutes). The drain effect has also proven to be a most efficient means of cappings extraction and eliminating the need for a separate wax spinning machine, and removing much more honey from the cappings than other spinners on the market. The processed cappings (beeswax) from this machine contain a minimal quantity of honey. There is a strong possibility that it may be marketable in this form in the future thus a further saving in the time and power used to melt the wax down is quite probable.

In tests operated by the Inventor he has found that differing extraction times are necessary to suit different honey, for example, for cold clover honey the extraction time is from 3 to 5 minutes. For cold honey dew the extraction time is from 6 to 7 minutes. The extraction times can be reduced by placing a steam or hot water jacket around the base of the vat 1. If the operation of the spinner 4 is to be inspected this may be done by viewing through the windows 15 which can be provided in the top 11.

Thus by this invention there is provided a method and apparatus for separating bees wax and honey.

A particular example has been described and it is envisaged that improvements and modifications can take place without departing from the scope and spirit of the appended claims.

What I claim and desire to obtain by Letters Patent of the United States is:

1. A method of separating bees wax and honey, said method consisting essentially of:
   packaging of plurality of hive frames with combs tightly together in a spinner, said spinner having a plurality of holes in its periphery and said frames being disposed radially with their sides in a juxtaposed, mutually self-supporting relationship;
   optionally pumping honey cappings through an inlet into said spinner, said cappings being forced against said periphery of said spinner;
   rotating said spinner whereby honey in said combs flows from both sides of said combs along the surfaces thereof and wherein said combs are emptied of honey from a central region outwardly, said honey passing between edges of adjacent combs and, optionally, from said cappings to contact the spinner and then through said holes of said spinner for collection, said passing of said honey between edges of adjacent combs being retarded by said juxtaposition of said frames thereby offering support to resist collapsing of said combs and eliminating the need for separate comb support elements.

2. A method of separating bees wax and honey, the method consisting essentially of the steps of:

forming a generally cylindrical spinner with a plurality of holes in the periphery thereof;

mounting in said cylinder spinner a cone-shaped base and over said cylindrical spinner an inlet for pumping honey cappings into said spinner, said spinner having its longitudinal axis vertical within a vat, said vat having a drain aperture in the base thereof;

packing the cylinder with a plurality of hive frames with honey combs, said frames being disposed radially with their side edges in a juxtaposed, mutually self-supporting relationship;

rotating said spinner to cause said honey and wax to separate and said honey to flow outwardly from both sides of the combs along the surfaces thereof so that each comb is emptied of honey from its central region outwardly, said honey passing between outside edges of adjacent combs and then through the holes in the periphery of the spinner for collection from the vat, said passing of said honey between edges of adjacent combs being retarded by said juxtaposition of said frames thereby offering support to resist collapsing of said combs and eliminating the need for separate comb support elements.

3. A method as claimed in claim 2 which additionally includes the application of heat to the spinner to allow the honey and wax to separate more easily.

4. An apparatus for separating bees wax and honey, said apparatus consisting essentially of:

a vat;

a spinner mounted in said vat, said spinner having its longitudinal axis vertical, a periphery of said spinner having a plurality of holes, said spinner being adapted to radially mount a plurality of hive frames with combs with their sides in a juxtaposed, mutually self-supporting relationship.

a drive means to rotate said spinner concentrically in said vat;

an inlet for optionally pumping honey cappings into said spinner whereby rotation of said spinner causes said honey to separate from said wax and flow from both sides of said combs along the surfaces thereof and wherein said combs are emptied of honey from a central region outwardly, said honey passing between edges of adjacent combs to contact said spinner and then through said holes of said spinner for collection, said passing of said honey between edges of adjacent combs being retarded by said juxtaposition of said frames thereby offering support to resist collapsing of said combs and eliminating the need for separate comb support elements.

5. An apparatus as claimed in claim 4 wherein the parts thereof are constructed from stainless steel.

6. An apparatus as claimed in claim 5 wherein the spinner is cylindrical and has an inverted cone-shaped base.

7. An apparatus as claimed in claim 6 wherein the spinner is formed from stainless steel mesh formed into a cylinder and joined to a cone-shaped base.

8. An apparatus as claimed in claim 7 wherein the spinner is mounted in a stainless steel vat from the bottom of which an outlet tube directs the separated honey for further processing.

9. An apparatus as claimed in claim 4 wherein the spinner is driven and rotated at about 300 rpm for 3 to 4 minutes.

10. An apparatus as claimed in claim 9 wherein operation thereof is electronically controlled.

* * * * *